(12) United States Patent
Srinivas et al.

(10) Patent No.: US 11,167,727 B2
(45) Date of Patent: Nov. 9, 2021

(54) COMPACT GEARBOX DESIGN FOR WINDSHIELD WIPER SYSTEM

(71) Applicant: ROSEMOUNT AEROSPACE INC., Burnsville, MN (US)

(72) Inventors: Nouduri Phani Srinivas, Karnataka (IN); Srivatsa Santyar, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 264 days.

(21) Appl. No.: 16/245,914

(22) Filed: Jan. 11, 2019

(65) Prior Publication Data
US 2020/0017075 A1  Jan. 16, 2020

(30) Foreign Application Priority Data
Jul. 13, 2018  (IN) .............................. 201811026204

(51) Int. Cl.
  *B60S 1/18* (2006.01)
  *B60S 1/08* (2006.01)
  *B60S 1/26* (2006.01)
  *F16H 19/00* (2006.01)
  *B60S 1/16* (2006.01)
(52) U.S. Cl.
  CPC ................ *B60S 1/185* (2013.01); *B60S 1/08* (2013.01); *B60S 1/16* (2013.01); *B60S 1/166* (2013.01); *B60S 1/26* (2013.01); *F16H 19/001* (2013.01)
(58) Field of Classification Search
  CPC .... B60S 1/185; B60S 1/08; B60S 1/26; B60S 1/16; B60S 1/18; B60S 1/166; F16H 19/001

USPC ............................................. 15/250.3; 74/98
See application file for complete search history.

(56) References Cited

U.S. PATENT DOCUMENTS

| | | | | |
|---|---|---|---|---|
| 2,494,538 | A * | 1/1950 | Baldo ........................ | B60S 1/18 74/79 |
| 2,878,506 | A * | 3/1959 | Krohm ................... | B60S 1/3402 15/250.21 |
| 5,404,085 | A * | 4/1995 | Resch ........................ | B60S 1/08 318/443 |
| 6,205,612 | B1 | 3/2001 | Tilli et al. | |
| 9,079,567 | B2 * | 7/2015 | Wegner ..................... | B60S 1/08 |

(Continued)

FOREIGN PATENT DOCUMENTS

| DE | 3044286 A1 | 6/1982 |
|---|---|---|
| DE | 102009014312 A1 | 9/2010 |

(Continued)

OTHER PUBLICATIONS

Machine translation of description portion of EP publication 2072357, published Jun. 2009. (Year: 2009).*
Search Report dated Nov. 26, 2019 in U311188EP, 4 pages.

*Primary Examiner* — Gary K. Graham
(74) *Attorney, Agent, or Firm* — Cantor Colburn LLP

(57) ABSTRACT

A windshield wiper system (WWS) is provided and includes a brushless direct current (BLDC) motor with a motor output shaft gear, a gear train and an internally cut sector gear. The gear train includes a first gear, which has a first diameter and engages with the motor output shaft gear, and a second gear, which has a second diameter that is shorter than the first diameter and rotates with the first gear. The internally cut sector gear is coupled with an output shaft and formed to define an internal geared groove that engages with the second gear.

14 Claims, 3 Drawing Sheets

(56) References Cited

U.S. PATENT DOCUMENTS

2007/0272787 A1 11/2007 Jian
2019/0337488 A1* 11/2019 Thirunarayana ........ B60S 1/185

FOREIGN PATENT DOCUMENTS

| DE | 102015205467 | * | 9/2016 |
| EP | 2072357 A2 | | 6/2009 |
| JP | 4216786 B2 | | 1/2009 |
| WO | 2011098185 A1 | | 8/2011 |

* cited by examiner

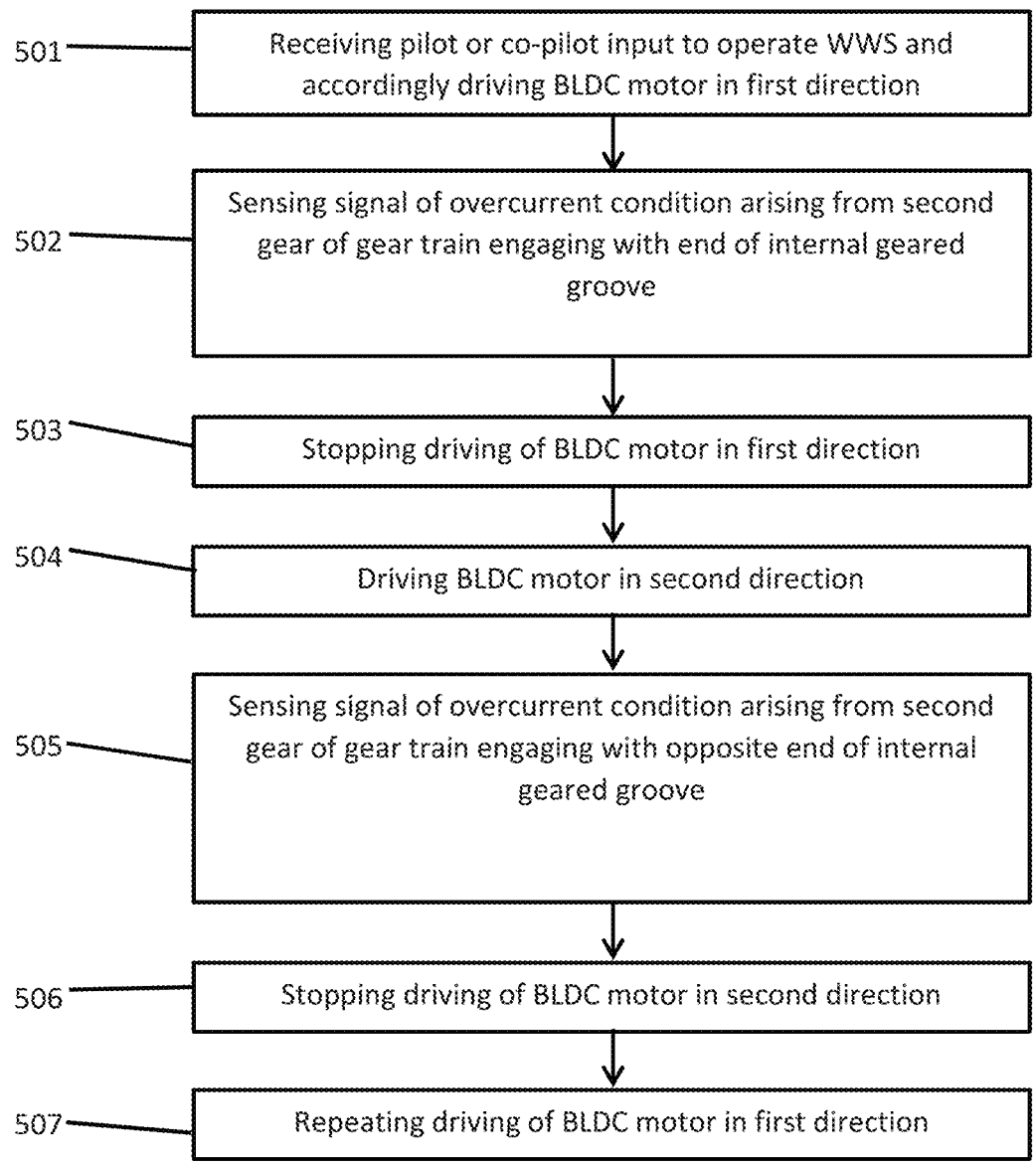

COMPACT GEARBOX DESIGN FOR WINDSHIELD WIPER SYSTEM

CROSS-REFERENCE TO RELATED APPLICATIONS

This application claims the benefit of Indian Patent Application. No. 201811026204 filed Jul. 13, 2018, which is incorporated herein by reference in its entirety.

BACKGROUND

The following description relates to a windshield wiper system (WWS) of an aircraft and, more specifically, to a WWS of an aircraft with a compact gearbox design powered by a bi-directional brushless direct current (BLDC) motor.

A WWS of an aircraft is used for cleaning rain, sand, dust, etc. from a windshield. Generally, a WWS includes a wiper arm that needs to move in both clockwise and counter-clockwise directions within a specific angle to keep the windshield clean for the pilot/co-pilot to have good visibility. The wiper arm is typically moved by a shaft that is connected to a motor through gearing but there are various design configurations available and each has its own advantages and disadvantages.

Typically, a WWS of an aircraft is operated as follows. Initially, pilot or co-pilot input activates an electronic control unit (ECU) and the ECU controls a BLDC motor accordingly. The ECU periodically reverses the BLDC motor direction to achieve oscillatory motion at the output shaft of the BLDC motor. The BLDC motor output shaft interfaces with a two-stage gear train to achieve required torque and speed at the gearbox output shaft. This oscillatory motion at the gearbox output shaft is transferred to the wiper externals.

BRIEF DESCRIPTION

According to an aspect of the disclosure, a windshield wiper system (WWS) is provided and includes a brushless direct current (BLDC) motor with a motor output shaft gear, a gear train and an internally cut sector gear. The gear train includes a first gear, which has a first diameter and engages with the motor output shaft gear, and a second gear, which has a second diameter that is shorter than the first diameter and rotates with the first gear. The internally cut sector gear is coupled with an output shaft and formed to define an internal geared groove that engages with the second gear.

In accordance with additional or alternative embodiments, an arc-length of the internal geared groove exceeds a required sweep angle of the WWS.

In accordance with additional or alternative embodiments, the internally cut sector gear includes stoppers at opposite ends of the internal geared groove.

In accordance with additional or alternative embodiments, a controller stores overcurrent trip logic.

In accordance with additional or alternative embodiments, mechanical interference between the second gear and either opposite end of the internal geared groove activates the overcurrent trip logic of the controller.

In accordance with additional or alternative embodiments, an axis of the output shaft is proximate to an exterior diameter of the first gear.

In accordance with additional or alternative embodiments, the internally cut sector gear includes a hub portion from which the output shaft extends and a sector gear portion, which extends radially outwardly from the hub portion and in which the internal geared groove is defined.

In accordance with additional or alternative embodiments, the sector gear portion includes an internal diameter portion comprising a smooth exterior facing surface, first and second radial portions extending radially outwardly from the internal diameter portion and apart from each other and an exterior diameter portion comprising internally facing teeth.

In accordance with additional or alternative embodiments, the first and second radial portions respectively include smooth internally facing surfaces and stoppers disposed along the smooth internally facing surfaces.

According to another aspect of the disclosure, an internally cut sector gear of a windshield wiper system (WWS) is provided and includes a hub portion from which an output shaft extends toward wipers of the WWS and a sector gear portion, which extends radially outwardly from the hub portion and in which an internal geared groove is defined for engagement with a motor driven gear train.

In accordance with additional or alternative embodiments, an arc-length of the internal geared groove exceeds a required sweep angle of the WWS.

In accordance with additional or alternative embodiments, the internally cut sector gear includes stoppers at opposite ends of the internal geared groove.

In accordance with additional or alternative embodiments, an axis of the output shaft is proximate to an exterior diameter of a large diameter gear of the gear train.

In accordance with additional or alternative embodiments, the sector gear portion includes an internal diameter portion comprising a smooth exterior facing surface, first and second radial portions extending radially outwardly from the internal diameter portion and apart from each other and an exterior diameter portion comprising internally facing teeth.

In accordance with additional or alternative embodiments, the first and second radial portions respectively include smooth internally facing surfaces and stoppers disposed along the smooth internally facing surfaces.

According to another aspect of the disclosure, a method of operating a windshield wiper system (WWS) is provided. The method includes driving a brushless direct current (BLDC) motor with an output shaft gear in a first direction with the output shaft gear engaged with a gear train that is, in turn, engaged with an internal geared grooved of an internally cut sector gear that is coupled with an output shaft, sensing an overcurrent condition arising from the gear train engaging with an end of the internal geared groove and stopping the driving of the BLDC motor in the first direction.

In accordance with additional or alternative embodiments, the method further includes driving the BLDC motor in a second direction opposite the first direction, sensing an overcurrent condition arising from the gear train engaging with an opposite end of the internal geared groove, stopping the driving of the BLDC motor in the second direction and repeating the driving of the BLDC motor in the first direction.

In accordance with additional or alternative embodiments, the driving includes determining when the gear train is close to engagement with the end of the internal groove, driving the BLDC motor in a second direction opposite the first direction, determining when the gear train is close to engagement with an opposite end of the internal groove and repeating the driving of the BLDC motor in the first direction.

In accordance with additional or alternative embodiments, an arc-length of the internal geared groove exceeds a required sweep angle of the WWS.

In accordance with additional or alternative embodiments, logic for executing the sensing and the stopping is provided in a controller of the BLDC motor.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 5 is a flow diagram illustrating a method of operating a WWS in accordance with embodiments.

These and other advantages and features will become more apparent from the following description taken in conjunction with the drawings.

DETAILED DESCRIPTION

As will be described below, a windshield wiper system (WWS) is provided to have a compact gearbox design with hard mechanical stops. The compact gearbox design includes an internally cut sector gear that is formed to define an internal geared groove. Opposite ends of the internal geared groove provide for mechanical stops and the internalization of the internal geared groove reduces an overall envelop of the gearbox design.

Figure 1:
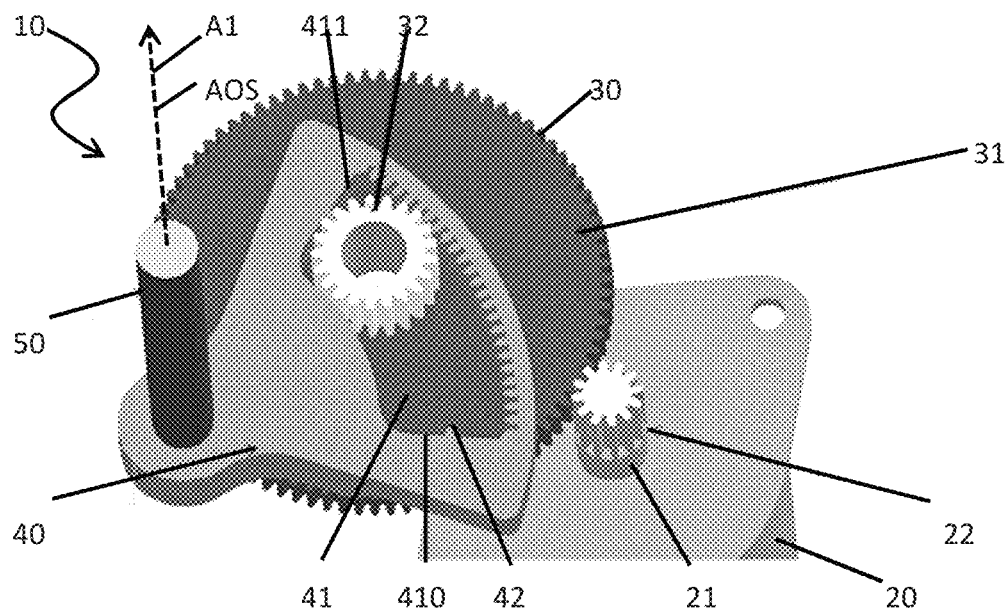
FIG. 1 is a perspective view of a compact gearbox design of a windshield wiper system (WWS) in accordance with embodiments.
Figure 2:
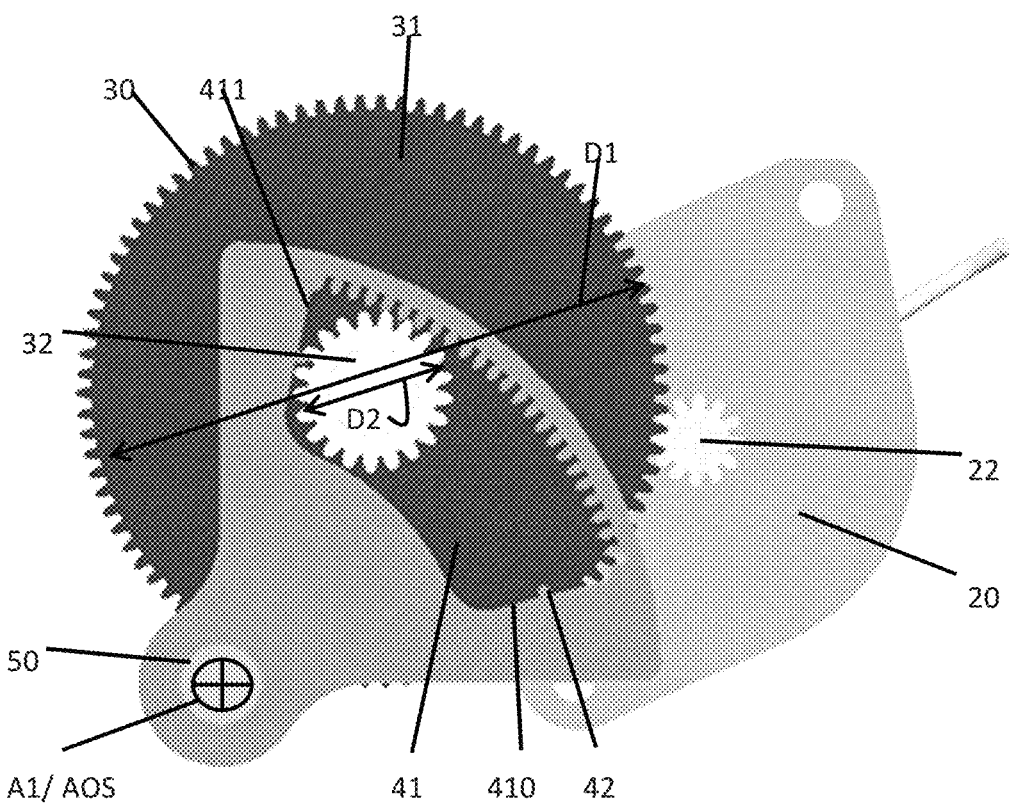
FIG. 2 is a top down view of the compact gearbox design of FIG. 1.

With reference to FIGS. 1 and 2, a windshield wiper system (WWS) 10 is provided and includes a brushless direct current (BLDC) motor 20 that is operable in opposite first and second directions and includes a rotatable shaft 21 with a motor output shaft gear 22, a gear train 30 and an internally cut sector gear 40. The gear train 30 includes a first gear 31 and a second gear 32. The first gear 31 has a first diameter D1 (see FIG. 2) and engages with the motor output shaft gear 22. The second gear 32 has a second diameter D2 that is shorter than the first diameter D1 and rotates about a rotational axis that is common to the first gear 31 and the second gear 32. The second gear 32 rotates with the first gear 31. The internally cut sector gear 40 is coupled with an output shaft 50 that connects with wiper blades of the WWS 10. The internally cut sector gear 40 is formed to define an internal geared groove 41 that engages with the second gear 32.

The gear train 30 may be configured such that an input speed of the motor output shaft gear 22 is decreased by the gear ratio between the first gear 31 and the second gear 32. In addition, owing to the internal gear groove 41 of the internally cut sector gear 40, an axis AOS of the output shaft 50 may be proximate to an outer diameter of the first gear 31. In particular, the axis AOS of the output shaft 50 may be within one diameter of the output shaft 50 from the outer diameter of the first gear 31. This has the effect of decreasing an overall envelope of the WWS 10 as compared to conventional systems in which the output shaft is coupled to a gear with external gearing.

As the BLDC motor 20 drives rotation of the motor output shaft gear 22, the motor output shaft gear 22 drives rotations of the first gear 31 and the second gear 32. The engagement between the second gear 32 and the internal geared groove 41 causes the internally cut sector gear 40 to rotate about a rotational axis A1. The axis AOS of the output shaft 50 may extend along the rotational axis A1. The rotation of the internally cut sector gear 40 continues until the second gear 32 reaches an end 410 of the internal geared groove 41. At this point, the BLDC motor 20 can be stopped by logic of a controller 301 (see FIG. 3) to be described below or reversed such that the rotation of the internally cut sector gear 40 reverses direction with the second gear 32 proceeding toward an opposite end 411 of the internal geared groove 41. An arc-length of the internal geared groove 41 may exceed or only slightly exceed a required sweep angle of the blades of the WWS 10 (see FIG. 4).

The internal geared groove 41 has the opposite ends 410 and 411 and may include stoppers 42 at the opposite ends 410 and 411. The stoppers 42 can provide a hard stop to the second gear 32 to indicate to the controller 301 that the second gear 32 has overreached and thus reached one of the ends 410 and 411 of the internal geared groove 41 and, in some cases, to indicate to the controller 301 in particular that the BLDC motor 20 has been driven to rotate too far in one direction. This indication can lead to overcurrent trip logic being engaged.

Figure 3:
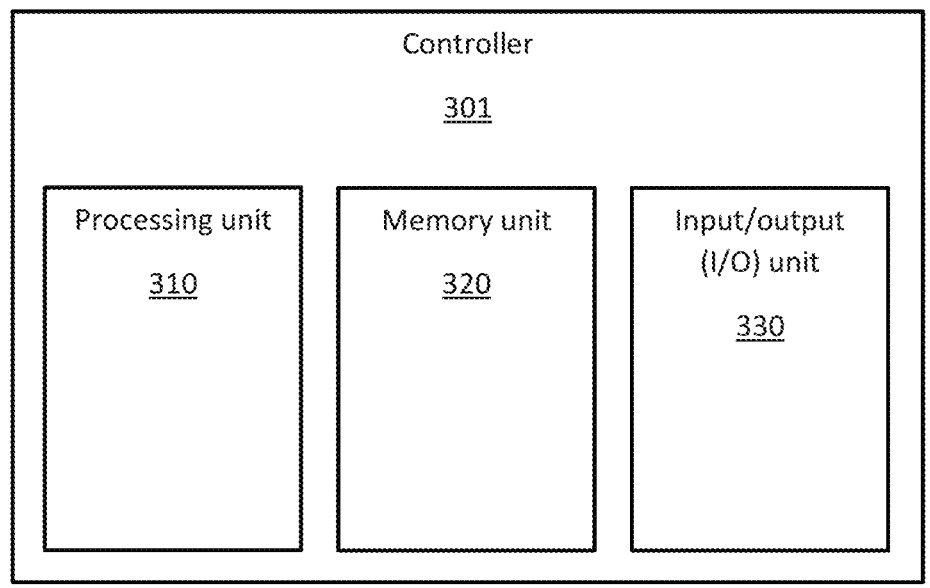
FIG. 3 is a schematic diagram of a controller of the WWS of FIGS. 1 and 2.

With reference to FIG. 3, the controller 301 may be provided as an electronic control unit (ECU) that is receptive of pilot or co-pilot input to start the WWS 10 and which is disposed and configured to operate the BLDC motor 20 in the first and second directions. The controller 301 includes a processing unit 310, a memory unit 320 and an input/output (I/O) unit 330 by which the processing unit 310 is communicative with the BLDC motor 20. The memory unit 320 has executable instructions stored thereon, which are readable and executable by the processing unit 310 to cause the processing unit 310 to operate as described herein. In particular, the executable instructions of the memory unit 320 define an overcurrent trip logic element that can be activated to being the WWS 10 to a halt when there is an overshoot leading to a locked condition and current being drawn from the BLDC motor 20 increasing.

Figure 4:
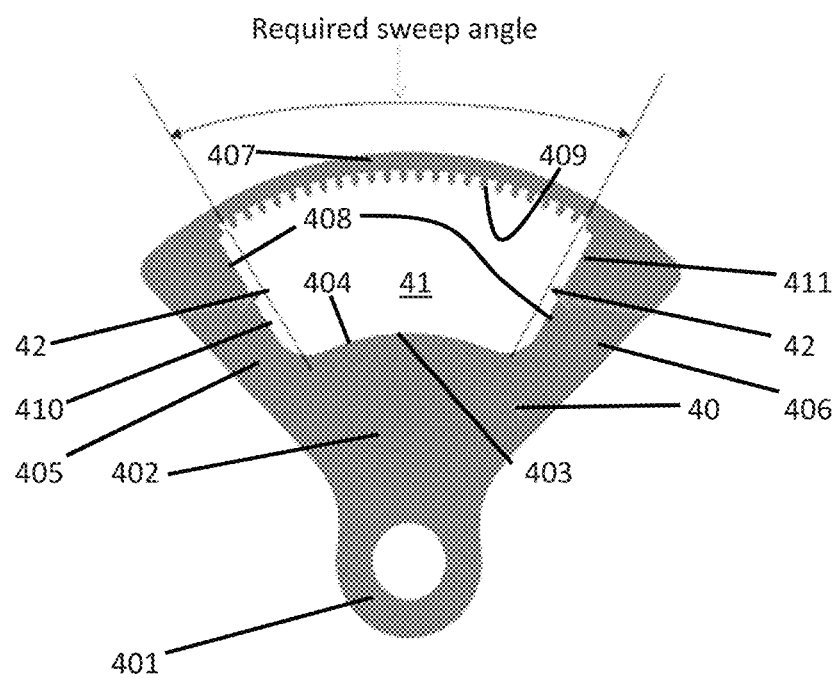
FIG. 4 is a top down view of an internally cut sector gear of the WWS of FIGS. 1 and 2.

With reference to FIG. 4, the internally cut sector gear 40 includes a hub portion 401, from which the output shaft 50 extends, and a sector gear portion 402. The sector gear portion 402 extends radially outwardly from the hub portion 401. The internal geared groove 41 is defined within the sector gear portion 402. As shown in FIG. 4, the sector gear portion 402 includes an internal diameter portion 403 that includes a smooth exterior facing surface 404, first and second radial portions 405 and 406 that extend radially outwardly from the internal diameter portion 403 and which taper apart from each other with increasing distance from the hub portion 401 and an exterior diameter portion 407. The first and second radial portions 405 and 406 each include a smooth internally facing surface 408 from which a stopper 42 extends inwardly. The exterior diameter portion 407 includes internally facing teeth 409 that engage with the second gear 32.

With reference to FIG. 5, a method of operating the WWS 10 is provided. As shown in FIG. 5, the method includes receiving a pilot or co-pilot input to operate the WWS 10 and accordingly driving the BLDC motor 20 in a first direction (501). The method further includes sensing a signal of an overcurrent condition arising from the second gear 32 of the gear train 30 engaging with an end 410 of the internal geared groove 41 (502) and stopping the driving of the BLDC motor 20 in the first direction (503).

In accordance with embodiments, the stopping of the driving of the BLDC motor 20 in the first direction of operation 503 can also be executed in response to a determination from readings of proximal position sensors that the second gear 32 of the gear train 30 is close to engagement with the end 410 of the internal geared groove 41.

Once the driving the BLDC motor 20 in the first direction is stopped, the method may further include driving the BLDC motor 20 in a second direction opposite the first direction (504), sensing a signal of an overcurrent condition arising from the second gear 32 of the gear train 30 engaging with an opposite end 411 of the internal geared groove 41 (505), stopping the driving of the BLDC motor 20 in the second direction (506) and repeating the driving of the BLDC motor 20 in the first direction (507).

In accordance with embodiments, the stopping of the driving of the BLDC motor 20 in the second direction of operation 506 can also be executed in response to a new determination from readings of the proximal position sensors that the second gear 32 of the gear train 30 is close to engagement with the end 411 of the internal geared groove 41.

Benefits of the features described herein are the provision of the WWS 10 with a compact gearbox design with hard mechanical stops.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A windshield wiper system (WWS), comprising:
    a brushless direct current (BLDC) motor with a motor output shaft gear;
    a gear train comprising a first gear, which has a first diameter and engages with the motor output shaft gear, and a second gear, which has a second diameter that is shorter than the first diameter and rotates with the first gear;
    an internally cut sector gear, which is coupled with an output shaft and formed to define an internal geared groove that engages with the second gear; and
    a controller storing overcurrent trip logic,
    wherein mechanical interference between the second gear and either opposite end of the internal geared groove activates the overcurrent trip logic of the controller.

2. The WWS according to claim 1, wherein an arc-length of the internal geared groove exceeds a required sweep angle of the WWS.

3. The WWS according to claim 1, wherein the internally cut sector gear comprises stoppers at opposite ends of the internal geared groove.

4. The WWS according to claim 1, wherein an axis of the output shaft is proximate to an exterior diameter of the first gear.

5. The WWS according to claim 1, wherein the internally cut sector gear comprises:
    a hub portion from which the output shaft extends; and
    a sector gear portion, which extends radially outwardly from the hub portion and in which the internal geared groove is defined.

6. The WWS according to claim 5, wherein the sector gear portion comprises:
    an internal diameter portion comprising a smooth exterior facing surface;
    first and second radial portions extending radially outwardly from the internal diameter portion and apart from each other; and
    an exterior diameter portion comprising internally facing teeth.

7. The WWS according to claim 6, wherein the first and second radial portions respectively comprise:
    smooth internally facing surfaces; and
    stoppers disposed along the smooth internally facing surfaces.

8. A windshield wiper system (WWS), comprising:
    a motor with a motor output shaft gear;
    a gear train comprising first and second gears, the first gear having a first diameter and engaging with the motor output shaft gear and the second gear having a second diameter shorter than the first diameter and rotating with the first gear; and
    an internally cut sector gear coupled with an output shaft and defining an internal geared groove engaging with the second gear,
    wherein mechanical interference between the second gear and either opposite end of the internal geared groove activates overcurrent trip logic.

9. The WWS according to claim 8, wherein an arc-length of the internal geared groove exceeds a required sweep angle of the WWS.

10. The WWS according to claim 8, wherein the internally cut sector gear comprises stoppers at opposite ends of the internal geared groove.

11. The WWS according to claim 8, wherein an axis of the output shaft is proximate to an exterior diameter of the first gear.

12. The WWS according to claim 8, wherein the internally cut sector gear comprises:
    a hub portion from which the output shaft extends; and
    a sector gear portion, which extends radially outwardly from the hub portion and in which the internal geared groove is defined.

13. The WWS according to claim 12, wherein the sector gear portion comprises:
    an internal diameter portion comprising a smooth exterior facing surface;
    first and second radial portions extending radially outwardly from the internal diameter portion and apart from each other; and
    an exterior diameter portion comprising internally facing teeth.

14. The WWS according to claim 13, wherein the first and second radial portions respectively comprise:
    smooth internally facing surfaces; and
    stoppers disposed along the smooth internally facing surfaces.

* * * * *